United States Patent [19]
Keith

[11] 4,190,998
[45] Mar. 4, 1980

[54] PIVOTABLY INTERLOCKING RIGID HEAT-RESISTANT TILES

[75] Inventor: Roger H. Keith, White Bear Lake, Minn.

[73] Assignee: Minnesota Mining and Manufacturing Company, St. Paul, Minn.

[21] Appl. No.: 905,152

[22] Filed: May 12, 1978

[51] Int. Cl.² ............................................. E04B 5/04
[52] U.S. Cl. ........................................ 52/591; 228/50; 404/41; 52/604
[58] Field of Search ................ 52/608, 609, 604, 594, 52/595, 591; 404/41; 405/16, 20

[56] References Cited

U.S. PATENT DOCUMENTS

| Re. 16,867 | 2/1928 | Healy | 52/597 |
| 850,048 | 4/1907 | Playford | 52/604 |
| 2,296,699 | 9/1942 | Bourdelais, Sr. et al. | 52/594 X |
| 3,347,048 | 10/1967 | Brown et al. | 52/595 X |
| 3,460,305 | 8/1969 | Long | 52/604 |

FOREIGN PATENT DOCUMENTS

| 2363227 | 6/1974 | Fed. Rep. of Germany | 404/41 |
| 1019255 | 1/1953 | France | 404/41 |

*Primary Examiner*—Carl D. Friedman

[57] ABSTRACT

Welding backup comprising a flexible backing to which is adhered a train of rigid, heat-resistant tiles having knuckle joints wherein a protuberance of one tile fits into an indentation in the mating tile so that the train of tiles is conformable to both convex and concave surfaces without stretching or kinking the backing.

13 Claims, 6 Drawing Figures

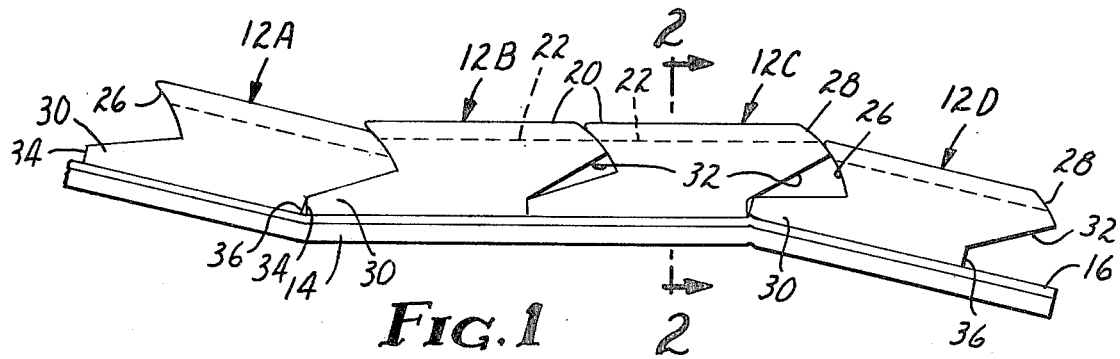
FIG. 1
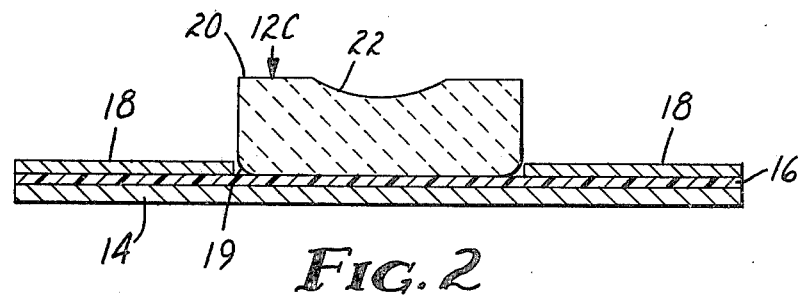
FIG. 2
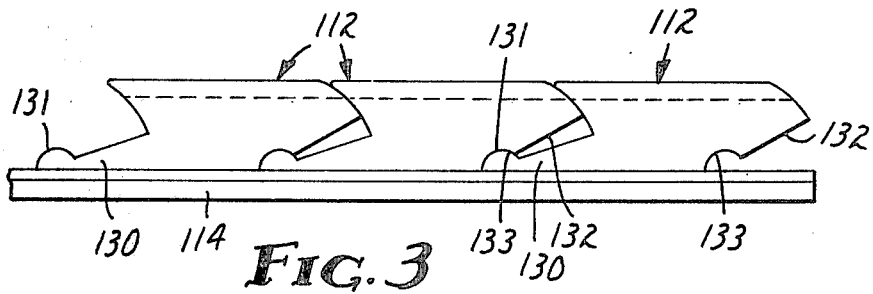
FIG. 3
FIG. 5
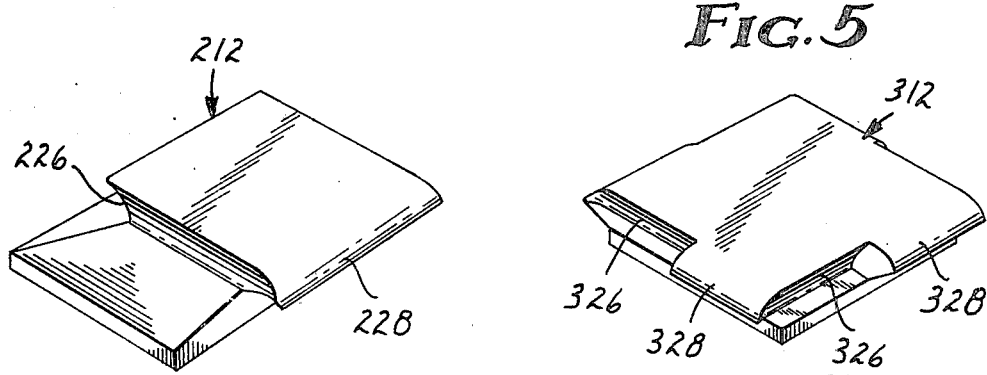
FIG. 4
FIG. 6

PIVOTABLY INTERLOCKING RIGID HEAT-RESISTANT TILES

FIELD OF THE INVENTION

This invention primarily concerns welding backups comprising rigid tiles but also concerns the tiles themselves since they have diverse utilities such as lining surfaces to protect them from abrasive action.

CROSS-REFERENCE TO RELATED APPLICATION

Prior to the present invention, a co-worker in my laboratory created a welding backup having a train of contiguous, rigid tiles joined together by interlocking knuckle joints which permit the train to hold molten metal during the welding of either a concave or a convex seam. Upon conforming the train to a convex surface, the backing to which the tiles are adhered is stretched at the tile junctures and hence must be extensible. Upon conforming the train to concave surfaces, the knuckle joints tend to open up and must be pushed back together to keep the knuckle joints closed, thus kinking the backing at the tile junctures.

That prior invention of my co-worker, John B. Snell, is the subject of a patent application Ser. No. 905,153, filed May 12, 1978.

THE PRESENT INVENTION

The tiles of the present invention, like those of Snell, provide a welding backup comprising an elongated, flexible, heat-resistant backing to which is adhered an interlocking train of uniform, contiguous, rigid tiles capable of supporting molten metal. Each tile has generally rectangular and parallel broad faces. As in Snell's invention, the contiguous ends of the tiles have knuckle joints comprising mating convex and concave cylindrical surfaces on substantially a common axis that extends transversely to the train of tiles. Unlike Snell, a concave cylindrical surface of each tile extends from its exposed face to a protuberance which forms part of one face of the tile, and the common axis of the cylindrical surfaces lies at or close to the apex of the protuberance. The mating cylindrical surface extends from the exposed face of that tile to an indentation which is contacted by the apex of the protuberance. The base of the protuberance is spaced from the indentation when the tiles are in collinear alignment, and the exposed faces of the train of tiles can be conformed to curved surfaces without substantial stretching or kinking of the backing.

Preferably, the spaced portions of the protuberance and the indentation have flat surfaces which together form a V-shaped opening of sufficient size to permit at least 5 degrees but not more than 20 degrees of pivoting for conforming the exposed faces of the tiles to a convex surface.

In order to enhance the pivoting action, the apex of the protuberance and the contacting portion of the indentation may have relatively small mating arcuate surfaces. When the arcuate surface on the apex of the protuberance is convex and both it and the mating concave surface are greater than quarter cylinders, they can coact to inhibit any tendency for contiguous tiles to separate longitudinally.

Whether or not the contiguous tiles can readily separate longitudinally, they are interlocking in the sense that the knuckle joints in cooperation with the backing tend to keep the faces of the tiles which contact the backing in alignment while the welding backup is bent to conform to curved surfaces.

While the present invention primarily provides an improved welding backup, the individual rigid, heat-resistant tiles are believed to be novel and to have utility for diverse uses. For example, the tiles may be used for lining surfaces to provide protection from abrasion, such as for lining interior surfaces of a grinding mill or of a chute for delivering abrasive materials such as coal, cement clinker, ores, gravel, rocks and the like. For such uses, the tiles may be formed to make knuckle joints along all four edges so that they can provide a blanket of tiles which is pivotally interlocked in both directions. For convenience in lining a ferromagnetic surface, the entire blanket of tiles may be adhesively bonded to a flexible magnet sheet. Preferably the adhesive is selected to permit tiles to be removed from the magnet sheet and selectively replaced after they become worn.

When used in welding backup, only two opposite ends of each tile are formed to make the knuckle joints and the other two sides may be flat. By forming both a convex and a concave cylindrical surface at each of said opposite ends, each cylindrical surface extending from the center to a flat side of the tile, each such end is matable with either such end of a similar tile. This makes it easier to orient the tiles for assembly into a train of tiles.

Where the tiles make knuckle joints along all four sides, each side may likewise have pairs of convex and concave cylindrical surfaces to be matable with any side of a like tile.

When used in welding backup, the tiles of the invention preferably have a width of 2–6 cm, a length of 0.6–3 cm and a thickness of 0.6–2 cm. For other uses the tiles might be substantially larger.

THE DRAWING

Detailed aspects of the invention will be better understood in conjunction with the drawing in which:

FIG. 1 is a schematic elevation of a preferred welding backup of the invention;

FIG. 2 is a cross-section along line 2—2 of FIG. 1;

FIG. 3 is a schematic elevation of another preferred welding backup of the invention;

FIG. 4 is a schematic isometric view of a tile of the invention which is formed to make knuckle joints at all four sides;

FIG. 5 is a schematic isometric view of a tile of the invention, each side of which will make a knuckle joint with any side of a like tile; and FIG. 6 is a side view of the tile shown in FIG. 5.

Referring first to FIGS. 1 and 2, a train of ceramic tiles 12A–12D having generally rectangular and parallel broad faces is positioned in contiguous end-to-end relationship extending centrally the full length of a flexible, heat-resistant backing 14 which has a pressure-sensitive adhesive coating 16 that adheres the tiles to the backing. A pair of disposable, low-adhesion webs 18 (shown in FIG. 2 but having been removed from FIG. 1) protect the adhesive coating 16 from contamination where it is not covered by the tiles. The faces of the tiles 12 which contact the adhesive coating 16 are substantially flat and rectilinear but their longitudinal edges 19 are blunt as seen in FIG. 2 to avoid accidental damage to the backing 14. The exposed face 20 of each tile has a uniform central longitudinal groove 22 which serves to increase the thickness of the welded seam.

The contiguous ends of the tiles are formed with knuckle joints by virtue of a concave cylindrical surface 26 at one end of each tile and a convex cylindrical surface 28 of the same radius at the other end of the tile. Each concave cylindrical surface 26 extends from the exposed face 20 of the tile to a protuberance 30 which is a truncated wedge. The common axes of each mating pair of the cylindrical surfaces 26 and 28 lie at the surface 34 of the apex of the protuberance 30. Each convex cylindrical surface 28 extends from the exposed face 20 of the tile to an indentation 32. The surface 34 of the protuberance 30 mates with a surface 36 on the indentation 32 of the contiguous tile.

The spaced portions of the protuberance 30 and the indentation 32 of contiguous tiles have flat surfaces which together form a V-shaped opening of 12 degrees when the tiles are in collinear alignment, as are tiles 12B and 12C as shown in FIG. 1, the indentation 32 of the tile 12B thus being spaced from the base of the protuberance 30 of the tile 12C.

In FIG. 1, the left-hand tile 12A has been pivoted about 12 degrees until the flat surface of its protuberance 30 is flush against the flat surface of the indentation 32 of tile 12B. Any effort to pivot futher would tend to lift the underface of the tile 12A from the backing 14 and could tear the backing.

In FIG. 1, the right-hand tile 12D has been pivoted about 12 degrees, thus enlarging the V-shaped opening between it and the tile 12C. Neither this pivoting nor the pivoting of the tile 12A with respect to the tile 12B has caused the backing 14 to be either elongated or buckled. The faces of the tiles in contact with the backing retain good alignment.

When the train of tiles is bent to conform at its exposed faces 20 to a convex surface, the flat surface of one indentation 32 contacts the flat surface of the facing protuberane 30. Upon further bending, the pivoting is translated from that knuckle joint to other knuckle joints until all of the facing flat surfaces are in contact. At this point, there is a sudden increase in resistance to warn the user that further bending might tear the backing.

Upon bending the welding backup to conform it at its exposed tile faces to a concave surface, there is no such translation of the pivoting action from knuckle joint to knuckle joint and no such warning. Neither is there any significant danger of tearing the backing.

The tiles 112 of the welding backup shown in FIG. 3 are similar to the tiles 12A-12D of FIGS. 1 and 2 except where the faces of the protuberances 130 contact the indentations 132. The apex of each protuberance has a convex arcuate surface 131 and the indentation has a mating concave arcuate surface 133, each of which is greater than a quarter cylinder. Since the backing 114 tends to keep in alignment the faces of the tiles 112 which contact the backing, the arcuate surfaces inhibit any tendency for interlocking tiles to separate longitudinally.

The tile 212 of FIG. 4 is similar to those of FIGS. 1 and 2 except that all four sides are formed to make knuckle joints, thus permitting the formation of a field or blanket of interlocking tiles. Each of its concave cylindrical surfaces 226 and convex cylindrical surfaces 228 extend across a full side of the tile.

All four sides of the tile 312 of FIGS. 5 and 6 will also make knuckle joints. Each side of the tile 312 has one concave cylindrical surface 326 and one convex cylindrical surface 328 extending from the center to an adjacent side of the tile. Each side of the tile 312 will make a knuckle joint with any side of a like tile.

I claim:

1. A rigid, heat-resistant tile having generally rectangular and parallel broad faces which with identical tiles can form an interlocking train or field of tiles wherein the ends of contiguous tiles form knuckle joints comprising mating convex and concave cylindrical surfaces on substantially a common axis that extends parallel to the broad faces of the tile, the tile having at one end (a) a protuberance which forms part of one face of the tile and (b) a concave cylindrical surface extending from a broad face of the tile to the protuberance and at the other end (c) an indentation and (d) a convex cylindrical surface extending from said broad face to the indentation which is contacted by the apex of the protuberance of a contiguous like tile and is spaced from the base of the protuberance when the contiguous tiles are in collinear alignment.

2. A tile as defined in claim 1 which is ceramic.

3. A tile as defined in claim 1 wherein its indentation and protuberance where spaced from the protuberance and indentation, respectively, of contiguous like tiles have flat surfaces which with the spaced portions of said contiguous like tiles form V-shaped openings of sufficient size to permit pivoting 5-20 degrees from collinear alignment for conforming to a convex surface the broad faces of the tiles which are adjacent to the cylindrical surfaces.

4. A tile as defined in claim 3 wherein each of said concave and convex cylindrical surfaces extends across the full side of each tile.

5. A tile as defined in claim 4 wherein the protuberance is a truncated wedge.

6. A tile as defined in claim 5 having generally flat sides and convex and concave cylindrical surfaces at opposite ends.

7. A tile as defined in claim 5 having convex cylindrical surfaces on two adjacent sides and concave cylindrical surfaces on the other two sides to permit the tile and like tiles to provide an interlocking field or blanket.

8. A tile as defined in claim 5 wherein the apex of the protuberance and the portion of the indentation which is contacted by the protuberance of a contiguous like tile have arcuate surfaces which mate with surfaces of contiguous like tiles.

9. A tile as defined in claim 8 wherein said arcuate surfaces are each greater than 90 degrees and inhibit any tendency for the tile to separate longitudinally from a contiguous like tile.

10. A tile as defined in claim 3 having at each of two opposite ends one convex and one concave surface, each extending from the center to a side of the tile and mating with either end of a like tile.

11. A tile as defined in claim 10 having one convex and one concave surface on all four sides to permit the tile and like tiles to provide an interlocking field or blanket.

12. A welding backup comprising an elongated, flexible, heat-resistant backing to which is adhered a train of interlocking tiles as defined in claim 1 and the sides of the tiles are substantially flat.

13. A tile as defined in claim 1 wherein said common axis lies at or close to the apex of the protuberance.

* * * * *